Feb. 5, 1952  F. H. SQUIRES  2,584,163
BOAT LOADING AND CARRYING MEANS
Filed Feb. 12, 1947  2 SHEETS—SHEET 1
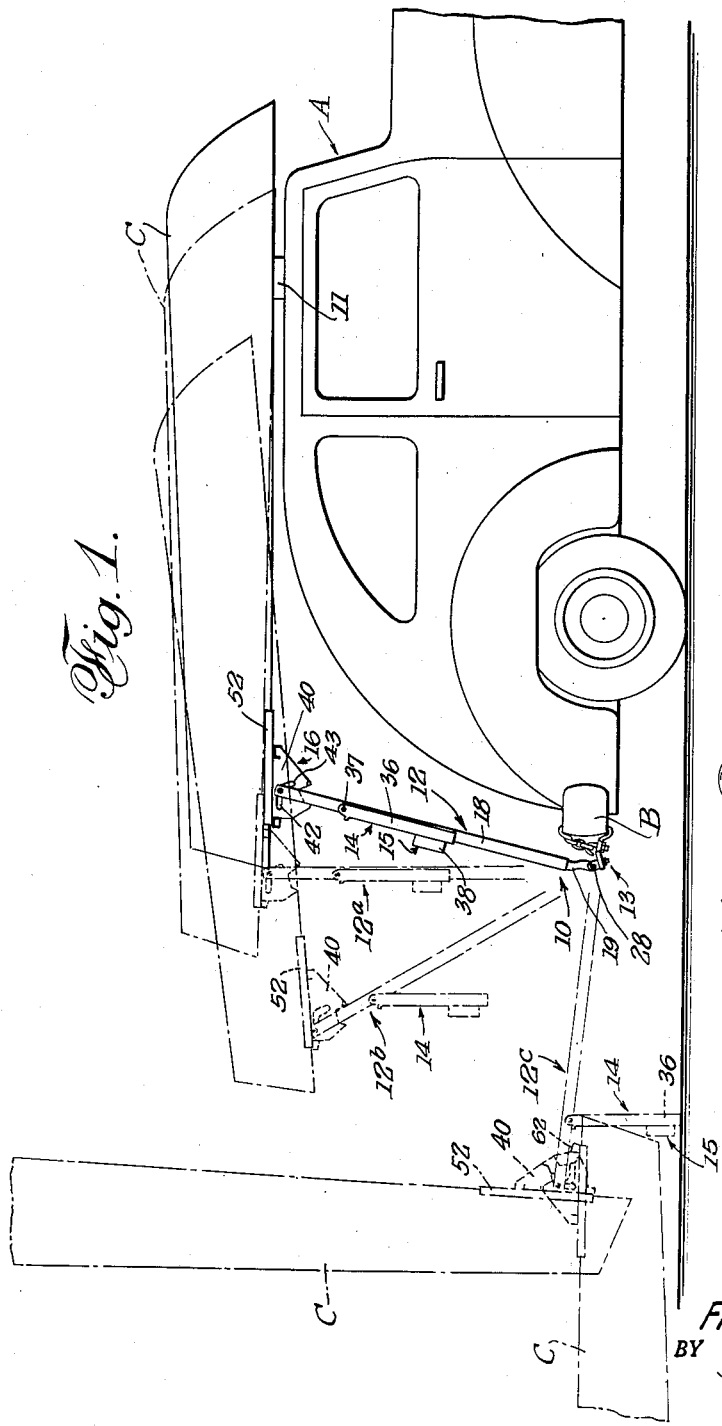
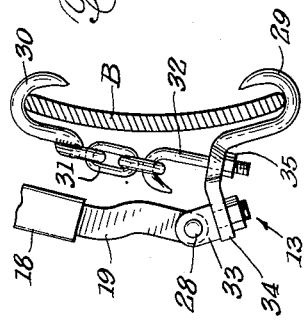
INVENTOR.
FRED H. SQUIRES
BY
C. G. Stratton
ATTORNEY Feb. 5, 1952  F. H. SQUIRES  2,584,163
BOAT LOADING AND CARRYING MEANS
Filed Feb. 12, 1947  2 SHEETS—SHEET 2
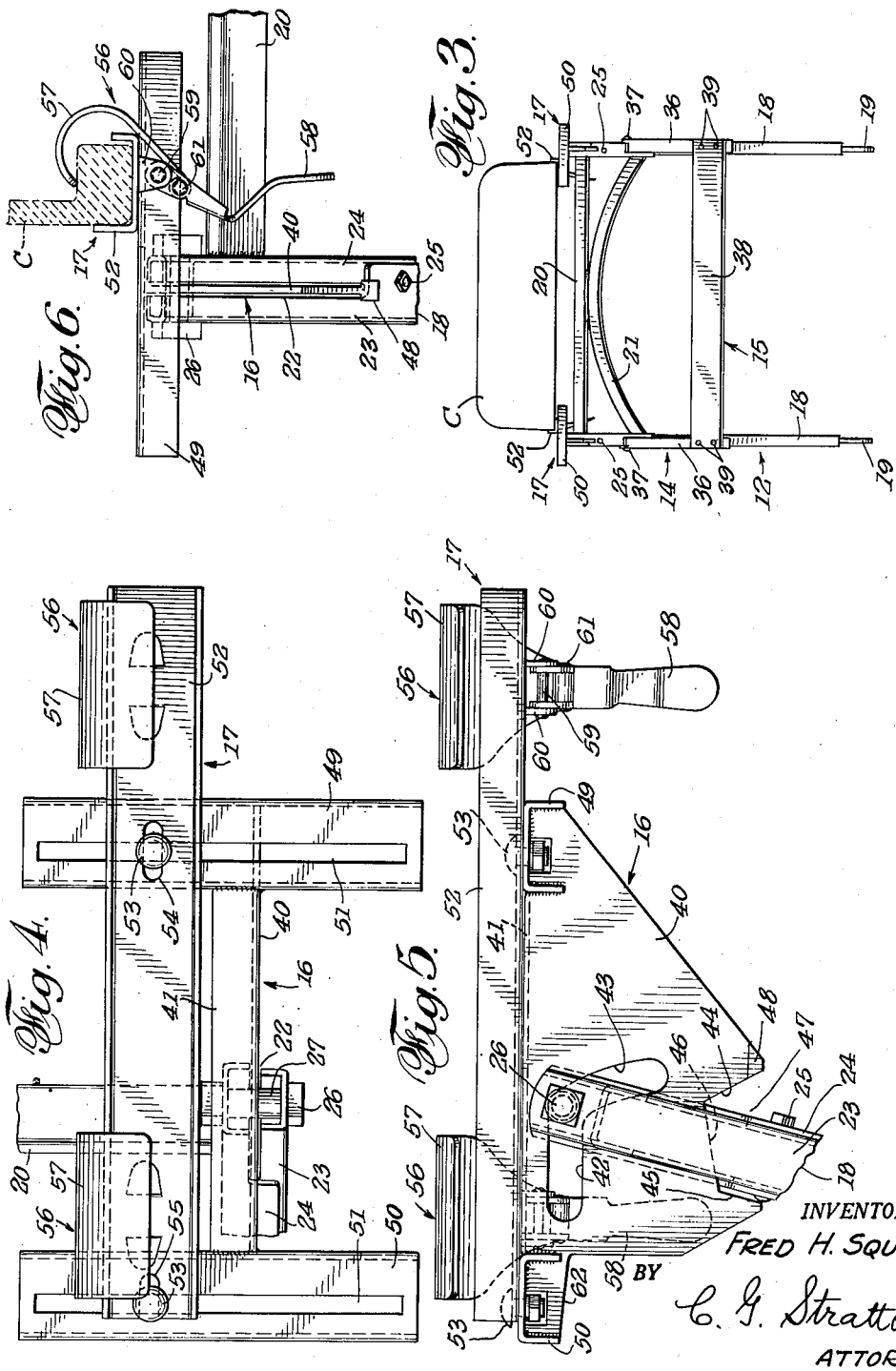
INVENTOR.
FRED H. SQUIRES
BY
C. G. Stratton
ATTORNEY Patented Feb. 5, 1952

2,584,163

UNITED STATES PATENT OFFICE 2,584,163

BOAT LOADING AND CARRYING MEANS

Fred H. Squires, Arcadia, Calif.

Application February 12, 1947, Serial No. 728,078

21 Claims. (Cl. 224—42.03)

1

This invention relates to means for loading a boat onto the top of a vehicle such as an automobile and the like and unloading said boat therefrom. Although the invention is more particularly directed to boat handling means, the same is also adapted to similarly handled luggage, camping equipment, etc.

The primary object of the present invention is to provide means of the character indicated which so mounts a boat or the like that the same is balanced for easy substantially effortless handling during both loading on and unloading from a vehicle such as an automobile.

Another object of the invention is to provide carrier means mounted on an automobile for safely carrying a boat on the top of the latter and embodying means which support the boat during loading and unloading thereof, an essential feature residing in a complete 180° rotation of the boat from an upside-down position on the automobile to a right-side-up position when completely unloaded, during unloading and vice versa, when loading.

Another object of the invention is to provide means in a device, as indicated, for carrying an outboard motor or the like, said means comprising a structural member of the device.

A further object of the invention is to provide improved and adjustable means for mounting the device herein on the rear bumper of an automobile, regardless of the width of said bumper.

My invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawings merely show and the following description merely describes one embodiment of the present invention, which is given by way of illustration or example only.

In the drawings, like reference characters designate similar parts in the several views.

Fig. 1 is a side elevational view illustrating the present invention in use.

Fig. 2 is an enlarged detailed view showing the adjustable means for mounting the instant device.

Fig. 3 is a rear view of the boat supporting and carrying means that is mounted on the means of Fig. 2.

2

Fig. 4 is an enlarged fragmentary plan view of improved mechanism for adjustably engaging a boat and embodying means for guiding the various positions of the boat during loading and unloading.

Fig. 5 is a side view thereof.

Fig. 6 is an end view as seen in a direction from the front of the car.

The particular form of the invention which is illustrated is shown as mounted on the rear bumper B of an automobile A. The boat loading and supporting device 10 supports a boat C in an inverted position atop said automobile whose top is provided with a cross rail 11 for protection thereof.

The present device 10 comprises, generally, a frame 12, adjustable means 13 mounting said frame on the bumper B for swinging movement in a vertical plane, a ground support 14 on the frame to support the latter in outermost position, a support hanger 15 for an outboard motor and the like, spaced plate means 16 engaged with the free end of the frame and having various sequential positions relative to said frame for supporting the boat C during loading and unloading thereof, and a laterally adjustable means 17 for releasably locking the boat to the frame.

As shown, the frame 12 comprises spaced parallel legs 18 each provided at its lower end with an extension 19 for pivotal connection to the means 13. The legs 18 are connected by a transverse member 20 and by an arched member 21 which strengthen the frame and render the same rigid. Each leg 18 is provided with an upper open-ended slot 22 in which the means 16 operate. To facilitate forming said slots and also the fabrication of the frame, each leg 18, at its upper end, is formed of interengaged channel members 23 and 24, the former being an extension of the leg 18 and the latter being connected by the mentioned transverse members 20 and 21. Suitable bolts 25 hold the channels 23 and 24 in assembly. The slot 22 is formed by notching back the telescoped flanges of the channel members 23 and 24. A pivot bolt 26 is carried by the upper end of each leg 18 firmly connecting the webs of channels 23 and 24 and a spacer tube 27 strung on the bolt spaces said webs and, thereby, retains the defining edges of slot 22 parallel.

The means 13 removably connects the frame 12 to the bumper B by a pivotal connection 28 for each extension 19. Each of the means 13 comprises opposed hooks 29 and 30 engaged with the opposed longitudinal edges of the bumper, a short chain 31 carried by the latter hook, an adjustable hook bolt 32 having selective engagement with the links of chain 31 and carried by the hook 29, and a pivot block 33 for pivot 29 carried by an extension 34 of hook 29. It will be seen that the structure of means 13 provides for secure clamping thereof on bumpers of different width since the hook bolt 32 is adjustable for effective length and the same is adapted for hooking engagement with any of the links of chain 31.

The frame 12 can be mounted in a central position on the bumper by first loosely applying the means 13 and then, after sliding them into desired position, firmly taking up on nuts 35 of the hook bolts.

As seen from Fig. 1, the frame 12 is pivotally mounted to swing between a position inclined toward the automobile to one substantially parallel to the ground. In the latter position, the ground support 14, which comprises a leg 36 pivoted at 37 on each frame leg 18, assumes a vertical position in frame supporting engagement with the ground. In the present instance, the legs 36 are connected by a cross bar 38 secured in place by bolts 39, said cross bar comprising the support hanger 15 previously mentioned. While shown as a simple beam, said bar may be formed or otherwise fabricated to efficiently perform the function as a hanger and also as a structural connector for the legs 36.

Each means 16 comprises a plate 40 flanged at 41 for strength and slidably residing in respective slots 22. Each plate 40 is formed with a slot having a substantially horizontal portion 42 and a downwardly and angularly directed portion 43. The bolt 26 operates in said slot with the leg channels 23 and 24 on either side of the plate. The lower edge of each plate, below the slot, is formed with an upwardly and rearwardly inclined edge 44 on the forward side of the plate, an upwardly and forwardly inclined edge 45 on the rearward side of said plate and with an upwardly and angularly directed connecting edge 46 connecting the edge 45 and edge 44. The edges 44, 45 and 46 define a bottom notch 47 in plate 40. A thickened abutment 48 is provided on said plate at the lower end of edge 44 to obviate movement of the leg past said edge.

The plates 40 are arranged in parallel relation in a longitudinal direction with respect to the automobile and each is provided with front and back transversely directed channels 49 and 50, respectively, welded to the respective plates. Said channels comprise support means for the laterally adjustable means 17 and, for the purpose, are each formed with a longitudinal slot 51. It will be obvious that the respective channels 49 and 50 are aligned.

Each means 17 comprises a channel 52, extending in the direction of plate 40 across the channels 49 and 50 and supported on the latter. A bolt 53 extends through each slot 51 and through transversely directed slots 54 and 55 longitudinally aligned in channel 52. The bolts 53 serve to lock channel 52, in laterally adjusted position, to the channels 49 and 50, said position being in accordance with the width dimension of the boat C, i. e., the gunwale spacing or beam.

As seen in Fig. 6, the gunwales of a boat are adapted to be positioned in the adjusted spaced channels 52 and a pair of longitudinally spaced clamps 56, carried by each of said channels, releasably locks the boat in place. Said clamps 56 each comprise an over-center toggle consisting of a clamp hook 57 and an actuating lever 58. The latter is carried on a pivot pin 59 across ears 60 struck from channel 52 and the clamp hook is pivotally carried at 61 by lever 58. The clamp hook, from a retracted position, is adapted to be swung into engagement with a rail formed on the gunwale and the lever 58 is then adapted to draw said clamp hook tightly into holding engagement with said rail.

Assuming the boat C to be clamped, by means 17, to the device 10 and the latter arranged as shown in full lines in Fig. 1 to support said boat atop the automobile A, the device, during unloading of said boat, operates as follows, after release of any holding means for the prow of the boat or that portion resting on rail 11.

In the full line position, in which the frame legs 18 are disposed as a forward angle of about 15° to the vertical, the bolt 26 resides in the forward part of slot 42 and the leg 18 is engaged against edge 45. A firm rear support for the boat is provided whereby the same rests in an inverted condition as shown.

To unload the boat, the frame 12 is pulled back on its pivot to assume the vertical position 12ᵃ. The bolt 26 remains as before and plate 40 pivots to bring edge 44 and abutment 48 into engagement with leg 18. The boat is still resting on rail 11, merely sliding thereon, as shown. Further rearward movement of the frame will first cause the bolt 26 to slide to a position against the rear of slot 42 while leg 18 is still engaged with abutment 48 to reduce the included angle to one which is more acute as shown in the position of 12ᵇ. A cantilever support of the boat is achieved as the same leaves contact with the car top, the weight of the boat being supported by abutment 48. In this position, the frame is at an approximate rearward angle of 30° to the vertical and the ground support 14 assumes a pendant vertical position.

The frame is then permitted to fall to the position of 12ᶜ where the ground support supports the same. The boat is still at an acute angle with respect to said frame and its weight is, therefore, supported and balanced. Now, with the abutment as a fulcrum, the boat is swung until the bolt 26 engages the forward end of slot 42 and the boat assumes a near vertical position and at a more obtuse angle with respect to frame 12. Then, with the bolt 26 fulcrumed at said forward end of slot 42, the boat is overbalanced and the edge 45 engages frame leg 18, the parts having the general relationship of the initial position. With the edge 45 as a sliding fulcrum, the boat is pulled rearwardly and the slot 43 moves with respect to the bolt 26 until the latter bottoms on slot 43. At this time, the end of edge 45 will be free to pass through slot 22 of leg 18 and the boat can be fulcrumed about bolt 26 until the same assumes a right-side-up position either with the keel on the ground or the plate edge 62 abutting leg 18 and holding the boat just clear of the ground. The clamp means 17 are now loosened, and the boat is ready for launching. The boat is as readily loaded by reversing the procedure above set forth.

It will be noted that the weight of the boat is under control at all times and that at no time is the operator required to lift or counteract said weight. It will further be seen that while the frame describes an approximately 90° arc, the boat, between loaded and unloaded positions, describes an arc of about 180°.

Since the same comprises no part of the present invention, suitable means (not shown) may be provided for releasably securing the boat C at its front end to cross rail 11. Suitable straps or clamps may be used.

If an outboard motor is to be carried, the same is readily mounted after the boat is mounted or is as easily removed from its support 15 before the boat is unloaded.

If the bumper B should be extremely narrow, by hooking the hook bolt 32 over the upper edge of said bumper and, temporarily discarding the hook 30 and the chain 31 secured thereto, an effective and secure mounting means for the frame 12 is provided.

While I have illustrated and described what I now regard as the preferred embodiment of my invention, the construction is, of course, subject to modifications without departing from the spirit and scope of my invention. I, therefore, do not wish to restrict myself to the particular form of construction illustrated and described, but desire to avail myself of all modifications that may fall within the scope of the appended claims.

Having thus described my invention, what I claim and desire to secure by Letters Patent is:

1. A device of the character described comprising means secured to a vehicle, a rigid frame hingedly connected to said means to move rearwardly of the vehicle in a vertical plane between an angular position directed toward the vehicle and a position approximately parallel to the ground at the rear of the vehicle, and means on the end of said frame for holding a boat in inverted position above the top of said vehicle and for presenting said boat in right-side-up position upon moving the frame to the ground-parallel position.

2. A device of the character described comprising means secured to a vehicle, a rigid frame hingedly connected to said means to move rearwardly of the vehicle in a vertical plane between an angular position directed toward the vehicle and a position approximately parallel to the ground at the rear of the vehicle, and means on the end of said frame for holding a boat in inverted position above the top of said vehicle and for presenting said boat in right-side-up position upon moving the frame to the ground-parallel position, said latter means being laterally adjustable to accommodate boats of different beam.

3. A device of the character described comprising means secured to a vehicle, a rigid frame hingedly connected to said means to move rearwardly of the vehicle in a vertical plane between an angular position directed toward the vehicle and a position approximately parallel to the ground at the rear of the vehicle, said frame describing an approximately 90° arc, and means on the end of the frame for holding a boat in inverted position above the top of said vehicle and presenting said boat in right-side-up position upon moving the frame to the ground-parallel position, said boat describing an arc between extreme positions of approximately 180°.

4. A device of the character described comprising means secured to a vehicle, and adjustable to engage and clamp the rear bumper thereof, a rigid frame hingedly connected to said means to move rearwardly of the vehicle in a vertical plane between an angular position directed toward the vehicle and a position approximately parallel to the ground at the rear of the vehicle, and means on the end of said frame for holding a boat in inverted position above the top of said vehicle and for presenting said boat in right-side-up position upon moving the frame to the ground-parallel position.

5. A device of the character described comprising a rigid frame hingedly connected to the rear bumper of a vehicle to move rearwardly of the vehicle in a vertical plane between a position inclined toward the vehicle and a position approximately parallel to the ground at the rear of the vehicle, adjustable means for clamping a boat adjacent its stern, and means connected to the latter means and having pivotal connection with the free end of said frame for holding the boat in inverted position above the top of the vehicle with the frame in the first mentioned position and for presenting the boat right-side-up with the frame in the other position.

6. A device of the character described comprising a rigid frame hingedly connected to the rear bumper of a vehicle to move rearwardly of the vehicle in a vertical plane between a position inclined toward the vehicle and a position approximately parallel to the ground at the rear of the vehicle, ground engaging means carried by the frame for supporting the same in the latter position, adjustable means for clamping a boat adjacent its stern, and means connected to the latter means and having pivotal connection with the free end of said frame for holding the boat in inverted position above the top of the vehicle with the frame in the first mentioned position and for presenting the boat right-side-up with the frame in the other position.

7. A device of the character described comprising a rigid frame hingedly connected to the rear bumper of a vehicle to move rearwardly of said vehicle in a vertical plane between a position inclined toward the vehicle and a position approximately parallel to the ground at the rear of the vehicle, ground engaging means carried by the frame for supporting the same in the latter position, said ground engaging means comprising a leg pivotally mounted on each side of the frame and a connecting bar therebetween, adjustable means for clamping a boat adjacent its stern, and means connected to the latter means and having pivotal connection with the free end of said frame for holding the boat in inverted position above the top of the vehicle with the frame in the first mentioned position and for presenting the boat right-side-up with the frame in the other position.

8. A device of the character described comprising a rigid frame hingedly connected to the rear bumper of a vehicle to move rearwardly of the vehicle in a vertical plane between a position inclined toward the vehicle and a position approximately parallel to the ground at the rear of the vehicle, ground engaging means carried by the frame for supporting the same in the latter position, said ground engaging means comprising a leg pivotally mounted on each side of the frame and a connecting bar therebetween, said connecting bar being adapted to support an outboard motor or the like, adjustable means for clamping a boat adjacent its stern, and means connected to the latter means and having pivotal connection with the free end of said frame for holding the boat in inverted position above the top of the vehicle with the frame in the first mentioned position and for presenting the boat right-side-up with the frame in the other position.

9. In a boat loading and unloading device, a rigid hinged frame comprising spaced connected legs each having an upper open-ended slot, said slots being parallel and coextensive, a pivot across each slot, means engaged with each pivot and both slidably and pivotally movable in each respective slot, clamp means on each of said means for engaging a boat and to hold the same both elevated and inverted in one position of same frame and both lowered and rightside-up in another position of said frame, and a ground-engaging support for the frame, while in said lowered position, and comprising a leg pivotally mounted on each leg of the frame between the pivot and slot thereof and a connecting bar for the legs.

10. In a boat loading and unloading device, a rigid frame hinged at its lower end and swingable on said hinge between an erect slightly forward position and a rearward position approximately 90° with respect thereto, a transverse pivot at the other end of said frame, a plate having an angularly formed slot therein, said pivot extending through said slot, said plate having an edge that is substantially horizontal when the frame is in its slightly forward erect position, there being clamping means for releasably securing a boat in horizontal inverted position to said plate whereby the boat moves with the plate, an abutment on said plate engaged with the frame for normally holding the plate and the boat clamped thereto in the mentioned horizontal position of the latter during the first mentioned position of the frame to form an angle greater than 90° between the frame and boat, a second abutment, opposed to the first abutment, on the plate and adapted to engage the frame when the latter is moved from its slightly forward position to a substantially erect position, the plate and boat pivoting on the pivot to retain the horizontal position of said boat to reduce the mentioned angle to approximately 90°, said second abutment engaging the frame to constitute a fulcrum about which, on further rearward movement of the frame, the plate and boat pivot to move the pivot on the frame from a midpoint of the slot to one end of said angularly formed slot, the included angle between the frame and the boat being thereby decreased to less than 90°, and a support for the free end of the frame when in full rearward position.

11. In a boat loading and unloading device, a rigid frame hinged at its lower end and swingable on said hinge between an erect slightly forward position and a rearward position approximately 90° with respect thereto, a transverse pivot at the other end of said frame, a plate having an angularly formed slot therein, said pivot extending through said slot, said plate having an edge that is substantially horizontal when the frame is in its slightly forward erect position, there being clamping means for releasably securing a boat in horizontal inverted position to said plate whereby the boat moves with the plate, an abutment on said plate engaged with the frame for normally holding the plate and the boat clamped thereto in the mentioned horizontal position of the latter during the first mentioned position of the frame to form an angle greater than 90° between the frame and boat, a second abutment, opposed to the first abutment, on the plate and adapted to engage the frame when the latter is moved from its slightly forward position to a substantially erect position, the plate and boat pivoting on the pivot to retain the horizontal position of said boat to reduce the mentioned angle to approximately 90°, said second abutment engaging the frame to constitute a fulcrum about which, on further rearward movement of the frame, the plate and boat pivot to move the pivot on the frame from a midpoint of the slot to one end of said angularly formed slot, the included angle between the frame and the boat being thereby decreased to less than 90°, and a support for the free end of the frame when in full rearward position, the boat and the plate, during the latter position of the frame being adapted to be swung on said second abutment as a fulcrum to again bring the pivot to the mid point of the slot to increase the angle between the boat and frame to approximately 90°, the boat thereby extending substantially vertically and some 90° with respect to its initial horizontal position, the boat and plate being adapted to be further swung to an aligned position with the frame and some 180° with respect to its initial horizontal position, the pivot on the frame moving to the opposite end of the angularly formed slot.

12. A device for loading a boat onto and unloading it from the top of a vehicle or the like, comprising a pair of radius rods, means for pivotally mounting the bottom ends of the rods on a vehicle, bracket means pivotally carried by the upper ends of the rods, said bracket means having means for detachably securing them to a boat, and abutment means on the rods and bracket means for limiting pivotal movement of the bracket means relative to the rods in one direction.

13. A device for loading a boat onto and unloading it from the top of a vehicle or the like, comprising a pair of radius rods, means for pivotally mounting the bottom ends of the rods on a vehicle, bracket means pivotally carried by the upper ends of the rods, said bracket means having means for detachably securing them to a boat, and abutment means on the rods and bracket means for limiting pivotal movement of the bracket means relative to the rods in one direction, said bracket means being rotatable in the opposite direction relative to the rods to an extent of at least 110°.

14. A device for loading a boat onto and unloading it from the top of a vehicle or the like, comprising: a pair of radius rods each having a bifurcated top end and a bottom end adapted for pivotal connection to a vehicle, a pair of brackets each having means for detachably securing it to a boat and each having a depending plate disposed between the bifurcations of a cooperating radius rod, and a slot in said plate, a cross pin carried by the bifurcated end of each radius rod and extending through and being movable along the respective slots, each of said plates presenting an abutment shoulder engageable with a radius rod below its bifurcated end and an abutment surface exposed to its slot and engageable with a cross pin to limit swinging movement of its carrying bracket in one direction relative to the radius rod, each of said slots being shaped to permit each bracket to swing about and arc in the opposite direction.

15. A device for loading a boat onto and unloading it from the top of a vehicle or the like, comprising: a pair of radius rods each having a bifurcated top end and a bottom end adapted for pivotal connection to a vehicle, a pair of brackets each having means for detachably securing it to a boat and each having a depending plate disposed between the bifurcations of a cooperating radius rod, and a slot in said plate, a cross pin carried by the bifurcated end of each radius rod and extending through and being movable along the respective slots, each of said plates presenting an abutment shoulder engageable with a radius rod below its bifurcated end and an abutment surface exposed to its slot and engageable with a cross pin to limit swinging movement of its carrying bracket in one direction relative to the radius rod, each of said slots being shaped to permit each bracket to swing at least 110° in the opposite direction relative to its cooperating radius rod.

16. A loading device comprising a radius rod, means for pivotally anchoring one end of the rod to permit the rod to swing about a radius, a bracket for attachment to an article to be loaded, and means for pivotally and slidably connecting the other end of the radius rod to the bracket, said latter means presenting opposed abutment surfaces limiting pivotal movement of the bracket relative to the radius rod.

17. A loading device comprising a radius rod, means for pivotally anchoring one end of the rod to permit the rod to swing about a radius, a bracket for attachment to an article to be loaded, and means for pivotally and slidably connecting the other end of the radius rod to the bracket, said latter means including a pin on the radius rod and a slot in the bracket through which the pin extends and along which the pin is movable, the slot being disposed to permit the bracket to swing in an arc relative to the radius rod.

18. A device for loading a boat on and unloading it from the top of a vehicle or the like comprising a pair of radius rods, pivot means for swingably securing the rods to a lower part of a vehicle, a pair of upright plates adapted to be secured to opposite gunwales of a boat, each of the plates having a slot and having spaced, opposed depending abutments engageable with a radius rod, and abutment means carried by the respective radius rods and extending through said respective slots, said respective slots providing end and intermediate abutment surfaces selectively engageable with the last-named abutment means carried by the respective radius rods and being shaped to permit the respective plates to swing about an arc relative to the respective radius rods.

19. A device for loading a boat on and unloading it from the top of a vehicle or the like comprising a pair of radius rods, pivot means for swingably securing the rods to a lower part of a vehicle, a pair of upright plates adapted to be secured to opposite gunwales of a boat, each of the plates having a slot and having spaced opposed depending abutments engageable with a radius rod, and abutment means carried by the respective radius rods and extending through said respective slots, said respective slots being substantially L-shaped whereby to provide end and intermediate abutment surfaces selectively engageable with the last-named abutment means carried by the respective radius rods and to permit swinging movement of the respective plates relative to the respective radius rods.

20. A device for loading a boat on and unloading it from the top of a vehicle or the like comprising a pair of radius rods, pivot means for swingably securing the rods to a lower part of a vehicle, a pair of upright plates adapted to be secured to opposite gunwales of a boat, each of the plates having a slot and having spaced, opposed depending abutments engageable with a radius rod, and abutment means carried by the respective radius rods and extending through said respective slots, said respective slots being shaped to provide an end abutment surface cooperable with the respective last-named abutment means and aligned with one of said depending abutments and another abutment surface intermediate its ends cooperable with said respective last-named abutment means and aligned with the other depending abutment, the distance between said abutment surfaces being sufficient to permit the respective plates to swing about a 110° arc relative to the respective radius rods.

21. A device for loading a boat on and unloading it from the top of a vehicle or the like comprising a radius rod having at its inner end means for pivotal attachment to a lower part of a vehicle, the outer end of the rod having bifurcations, a plate disposed between the bifurcations and having means for attachment to a boat, a substantially L-shaped slot in the plate, providing end and intermediate abutment surfaces, depending abutment members on the plate aligned respectively with the intermediate and an end abutment surface of the plate, said abutment members being selectively engageable by the radius rod portion below the bifurcations, and a cross pin carried by the radius rod and extending across the slot in the plate, said cross pin being selectively engageable with said abutment surfaces.

FRED H. SQUIRES.

REFERENCES CITED

The following references are of record in the file of this patent:

UNITED STATES PATENTS

| Number | Name | Date |
|---|---|---|
| 114,034 | Pettit | Apr. 25, 1871 |
| 840,360 | Normand | Jan. 1, 1907 |
| 2,174,952 | Spikings, Jr. | Oct. 3, 1939 |
| 2,180,032 | Casley | Nov. 14, 1939 |
| 2,294,864 | Palmer | Sept. 1, 1942 |
| 2,338,934 | Gross | Jan. 11, 1944 |
| 2,392,008 | Squires | Jan. 1, 1946 |
| 2,486,316 | Morse et al. | Oct. 25, 1949 |
| 2,521,815 | Will | Sept. 12, 1950 |

OTHER REFERENCES

Popular Mechanics (page 121), Aug. 1946, "Boat Has Carrier Attachment for Hoisting to Top of Car."